United States Patent [19]
Mears, Jr. et al.

[11] 3,714,434
[45] Jan. 30, 1973

[54] DESPIN CONTROL SYSTEM FOR A MULTISPIN STABILIZED DEVICE

[75] Inventors: Carleton M. Mears, Jr., Las Alamitos; Paul W. Oberle, Placentia, both of Calif.

[73] Assignee: Hughes Aircraft Company, Culver City, Calif.

[22] Filed: Jan. 29, 1971

[21] Appl. No.: 111,127

Related U.S. Application Data

[63] Continuation of Ser. No. 657,393, July 31, 1967, abandoned.

[52] U.S. Cl............250/83.3 H, 244/1 SS, 250/203 R
[51] Int. Cl...............................G01j 1/02, G01j 1/20
[58] Field of Search.........250/83.3 H, 203; 244/1 SS, 244/1 SA, 77 B, 77 SS

[56] References Cited

UNITED STATES PATENTS

| | | |
|---|---|---|
| 3,090,583 | 5/1963 | Behun et al......................250/83.3 H |
| 3,427,453 | 2/1969 | Gill et al..........................250/83.3 H |
| 3,227,397 | 1/1966 | Good, Jr. et al. |

FOREIGN PATENTS OR APPLICATIONS

| | | |
|---|---|---|
| 958,415 | 5/1964 | Great Britain |
| 1,027,017 | 4/1966 | Great Britain |

*Primary Examiner*—Archie R. Borchelt
*Attorney*—W. H. MacAllister, Jr. and E. F. Oberheim

[57] ABSTRACT

A stabilized device comprising a rotatably coupled despun section and rotor section including a control having sensors responsive to a body externally of the stabilized device and responsive to relative rotation of the despun section and rotor section for controlling the angular position of said despun section relative to the external body.

11 Claims, 11 Drawing Figures

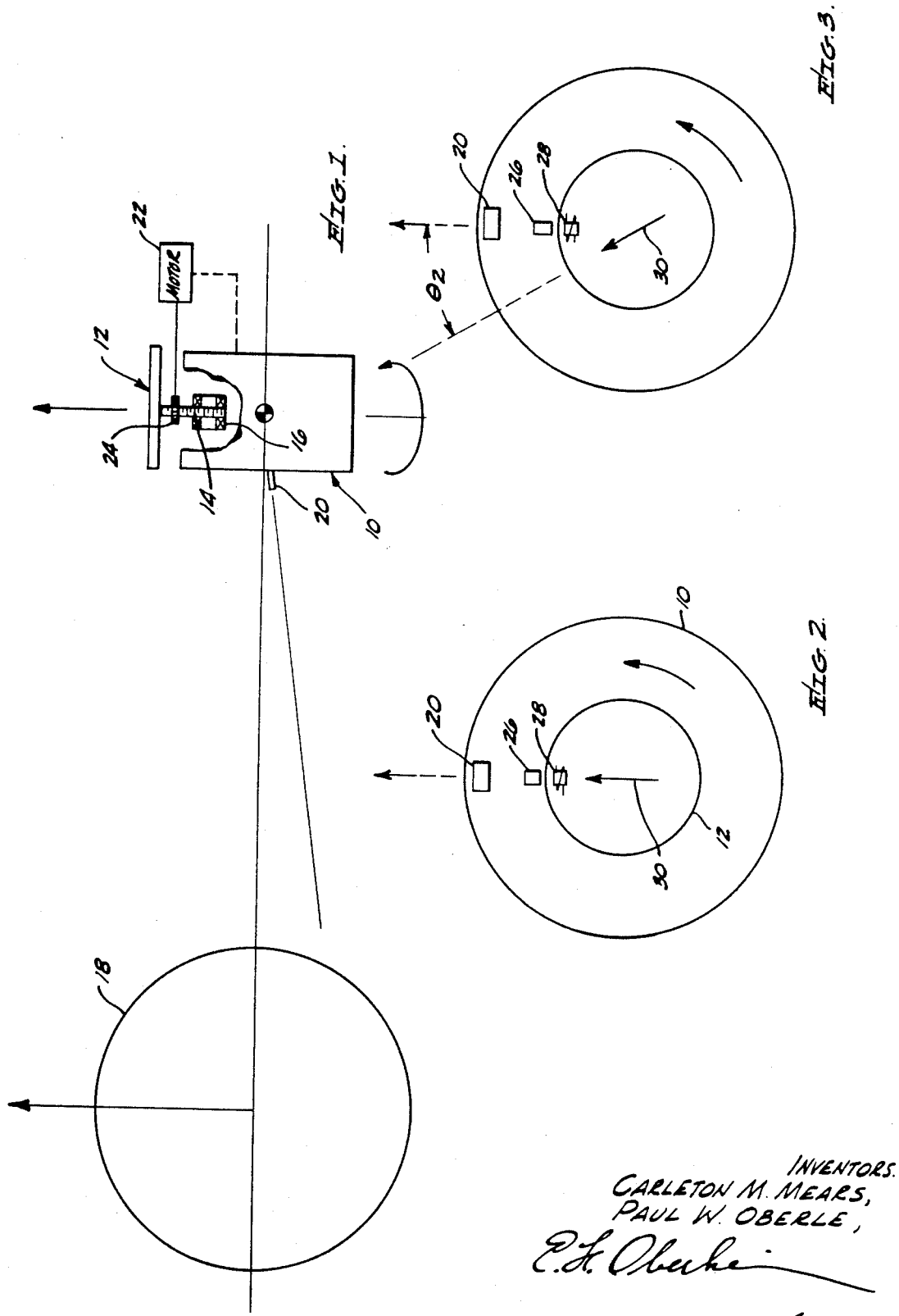

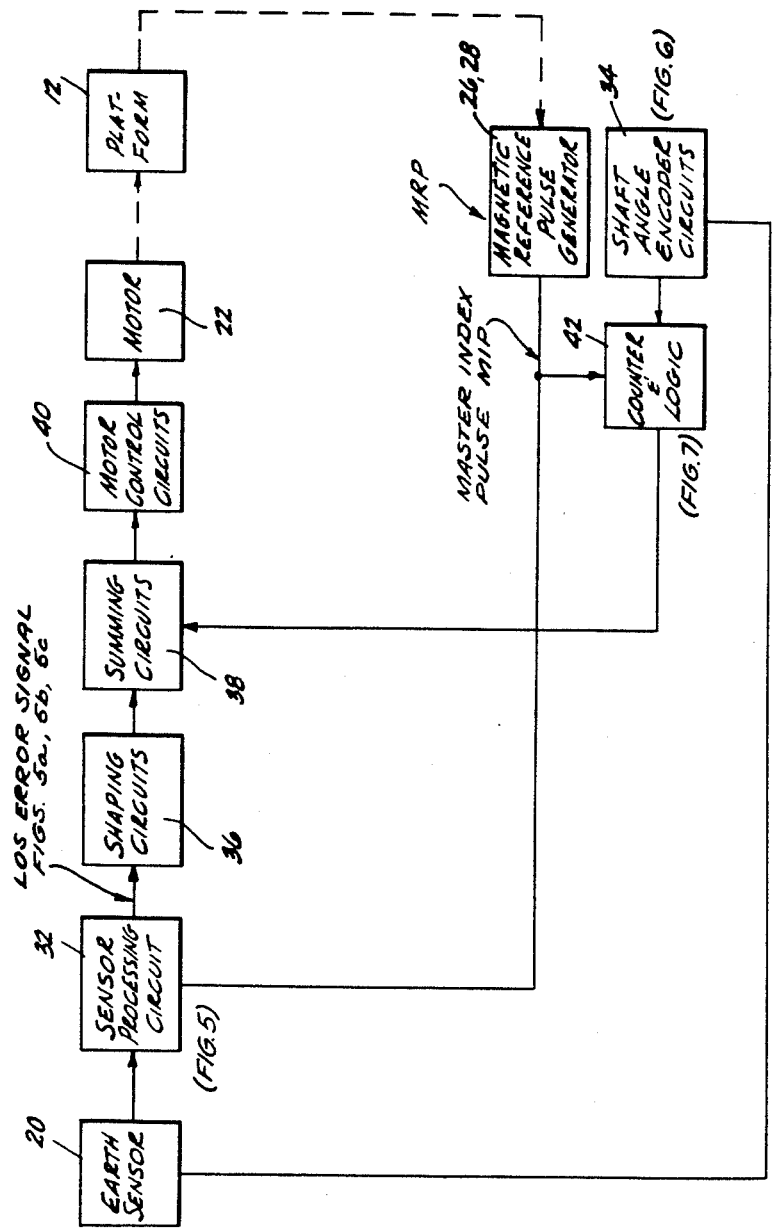

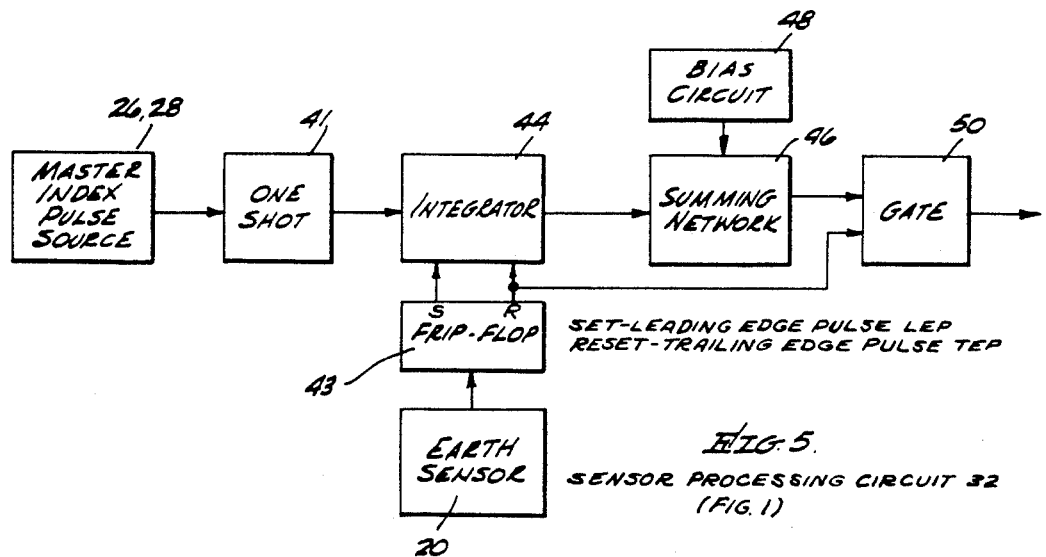
FIG. 5.
SENSOR PROCESSING CIRCUIT 32
(FIG. 1)
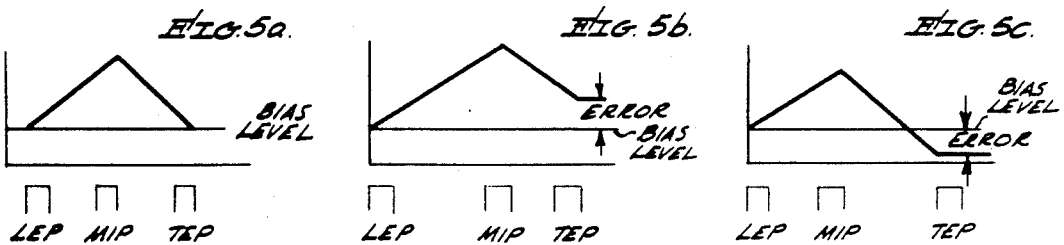
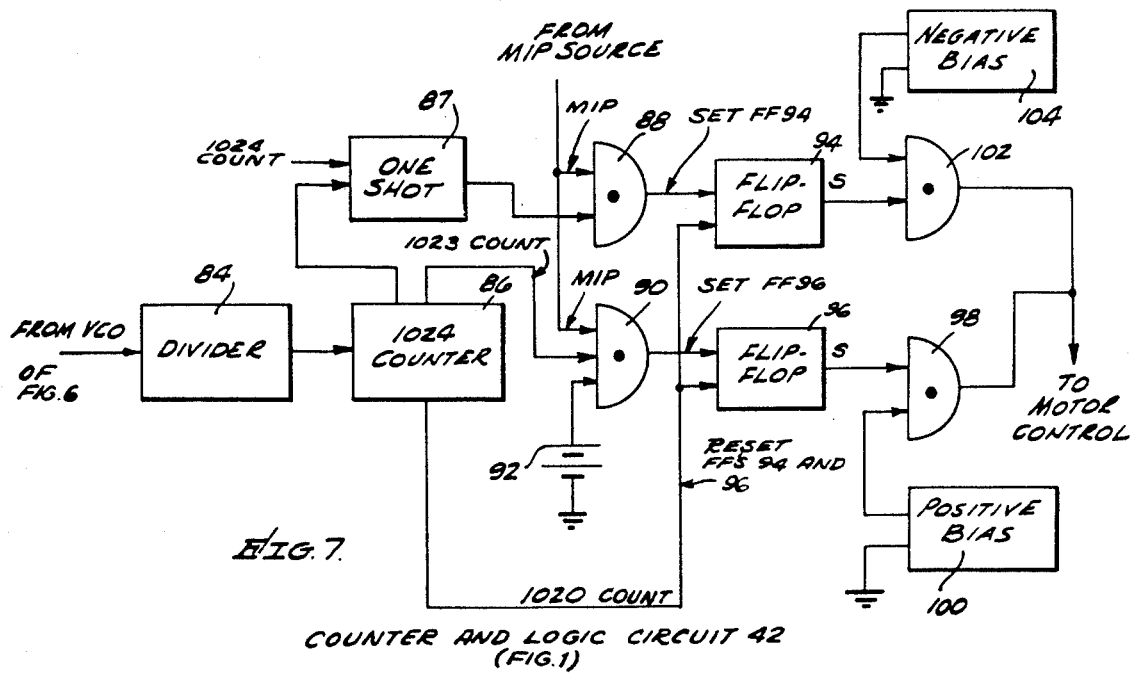
FIG. 7.
COUNTER AND LOGIC CIRCUIT 42
(FIG. 1)

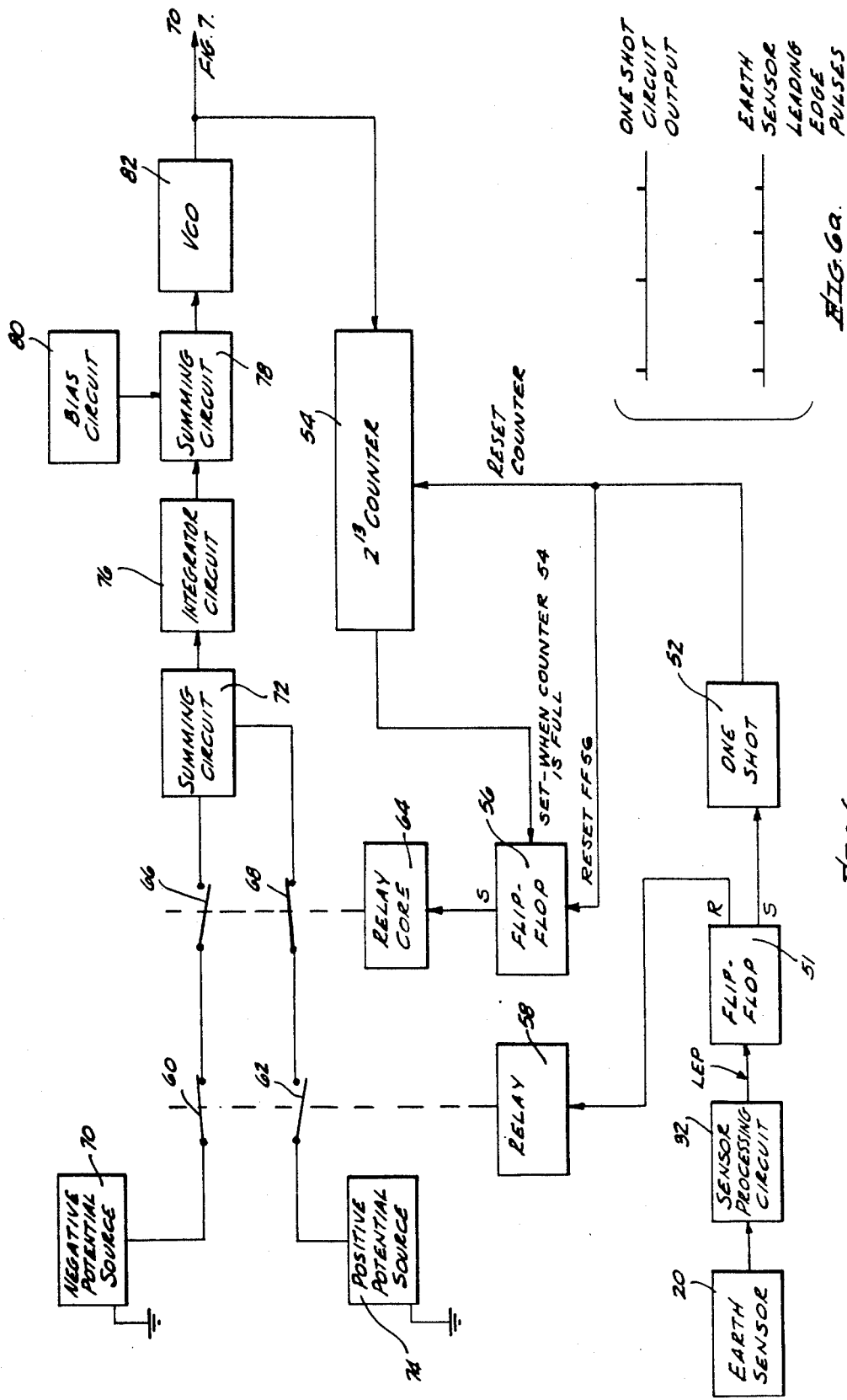

DESPIN CONTROL SYSTEM FOR A MULTISPIN STABILIZED DEVICE

This application is a continuation of application Ser. No. 657,393, filed July 31, 1967, and entitled DESPIN CONTROL SYSTEM FOR A MULTISPIN STABILIZED DEVICE, and now abandoned.

BACKGROUND OF THE INVENTION

In order to provide for communications between countries on opposite sides of the earth, satellites have been orbited into what is called stationary orbits. There, they serve to receive signals from one portion of the earth and relay them back to a second portion of the earth. It is desirable to maintain these satellites in a manner so that their receiving and transmitting antennas are always directed toward the earth so that they are in the most favorable position to accomplish their intended functions. To better accomplish such antenna orientation, an earth satellite may be employed which has a stable section or platform which is not spinning upon which the communications equipment and antennas may be carried for effectuating the desired antenna orientation, together with a spinning section or rotor which provides the required forces for properly orienting the satellite. The despun section of the satellite is supported by bearings from the rotatable section or rotor of the satellite so that the despun section, with the application of the proper forces, may be maintained stationary.

However, since there is a rotatable coupling between the rotor section and the despun section of the satellite, due to friction occurring in the rotatable coupling, the rotor section of the satellite will continuously apply a torque to the despun section to cause it to rotate. It is also necessary to cause the despun section to assume a desired orientation relative to the earth or other reference body.

Accordingly, an object of this invention is to provide a system whereby the despun section may be controlled to be maintained in a desired position despite the application of torque thereto by the spinning rotor section of the satellite.

SUMMARY OF THE INVENTION

The foregoing and other objects of this invention are achieved by generating two signals designated as a leading edge and trailing edge signal each time a predetermined location on the spinning rotor crosses the edge of the earth, and time it departs from the trailing edge of the earth. A master index pulse signal is generated for each revolution of the spinning rotor section each time a predetermined position on the spinning rotor section crosses a predetermined position on the despun section. It should be appreciated that if the despun section is rotating, this master index pulse will occur at different times. A first error signal is generated by combining the trailing edge and leading edge pulses with the master index pulse. This error signal is determined by the time of occurrence of the master index pulse relative to the leading and trailing edge pulses. If it occurs exactly midway between these, the error signal is substantially zero. The error signal is positive or negative depending upon whether the master index pulse is closer to the leading edge pulse or closer to the trailing edge pulse.

For rate control of the despun section relative to the desired line-of-sight of the despun section, one of the earth sensing signals (leading edge pulse) is used to control the frequency of an oscillator in a manner so that it will produce a predetermined number of pulses for each complete rotation of the rotor section. These pulses are counted in a counter which fills at a predetermined count equal to the number of oscillations occurring during a complete rotation of the rotor section. The count of the counter is compared with the occurrence of the master index pulse. If this occurs synchronously with the filling of the counter, then no angular rate error signal is generated. If this occurs prior to or subsequent to the filling of the counter, then it is known that the despun section has shifted angularly from a predetermined reference position, thus attaining a line-of-sight angular rate error.

A suitable error signal is generated and added to the angular rate error signal previously generated. The sum of the error signals is used to drive a motor which can rotate the despun section in a direction to bring it to the desired reference position.

It should be noted that the foregoing describes an electronic arrangement for generating pulses responsive to the rotation of the spinning rotor relative to the despun section. This is not to be considered as a limitation on the invention since this also can be done using mechanically interrupted light sources or electromagnetically generated signals. Basically, the equipment described is a shaft position encoder whose output is used to generate rate information.

BRIEF DESCRIPTION OF THE DRAWINGS

FIG. 1 is a simplified diagram showing the representative geometry of the spacecraft and its orbit.

FIG. 2 and FIG. 3 are schematic plan views of the rotor section and the despun section of the spacecraft, also illustrating the placement of the reference signal generating equipment.

FIG. 4 is a functional block diagram of a despin control system in accordance with this invention.

FIG. 5 is a schematic diagram of the sensor processing electronics used to generate an error signal from the earth leading and trailing edge pulses and master index pulse.

FIGS. 5A, 5B and 5C are waveform diagrams shown to assist in an understanding of the invention.

FIG. 6 is a block schematic diagram of the circuitry required for generating a reference frequency for a rotation of the spinning rotor.

FIG. 6A is a pulse timing diagram for the circuit of FIG. 6.

FIG. 7 is a block schematic diagram of the counter and logic circuits used to generate an error signal in response to the master index pulse and the reference frequency.

DESCRIPTION OF THE PREFERRED EMBODIMENT

Referring now to FIG. 1, there may be seen a drawing of the representative geometry of the spacecraft relative to the earth. The spacecraft will have a spinnable rotor section 10, to which the despun section 12 is attached through a shaft 14, supported on bearings 16, which are mounted on the spinnable rotor section. The details of how the spinnable rotor section is made to spin will not be described, since they are not a part of this invention. Briefly, this is accomplished by the placement of small jets which are properly operated. The spacecraft is orbited about the earth 18.

The rotor section carries an earth sensor 20. This usually comprises a thermistor bolometer. In orbit, when spinning, this detects the location of the earth by sensing its high temperature relative to the cold of deep space. The bolometer produces a first pulse, called a leading edge pulse, when its line of sight intercepts the edge of the earth as the rotor section is spinning, and then, after sweeping across the earth, produces a second or trailing edge pulse as it detects the boundary between the trailing edge of the earth and deep space.

It should be appreciated that even with the finest type of bearings employed for supporting the shaft 14 from the rotor section, there will be some torque applied to the despun section as a result of friction existing in the bearing supports. Thus, the despun section will tend to rotate within the rotor section unless some action is taken to prevent this. The despun section may be maintained stationary by using and controlling jets, or by driving an electrical motor, represented in FIG. 1 by the rectangle 22, which is positioned on the rotor section. The motor can drive a gear assembly 24 which is coupled to the despun section shaft 14 or can be directly coupled to the shaft as desired. The motor can drive the shaft so as to cause the despun section to remain substantially stationary with the desired orientation, despite the torque applied thereto by the despin bearing assembly.

FIGS. 2 and 3 are schematic views and elevation of the despun and rotor sections of the spacecraft, which are shown to provide a better understanding of this invention. In addition to the earth sensor 20 being mounted on the rotor section, it is also desirable, in accordance with this invention, to provide means for detecting when the rotor section and the despun section assume a fixed or predetermined alignment relative to each other during each cycle of rotation of the rotor section. Such information may be provided in any number of different ways. By way of example, a magnet 26 may be mounted on the despun section and a coil 28 may be mounted on the rotor section. Therefore, each time the magnet is rotated past the coil, a voltage is induced in the coil indicative of the instant angular relationship between the two sections of the spacecraft. Obviously, the positions of the magnet and coil may be interchanged. If an antenna boresight, represented by the arrow 30 on the despun section, is assumed to have a direction passing through the aligned magnet and coil, then the fact that the antenna has reached this angular position relative to the rotor can be indicated by the occurrence of the signal generated by the magnet and coil 26, 28. If it is desired that the boresight 30 have another orientation than the one shown, such as that shown in FIG. 3, the arrangement just described may also be employed. In FIG. 3 the angle $\theta_2$ is the desired angle to be made by the antenna boresight as measured between the boresight line and a line to the center of the earth. By setting this boresight relative to the position of the magnet on the despun section, as seen in FIG. 3, the selected boresight alignment is indicated by the occurrence of the output signal from the coil.

As a matter of fact, this arrangement enables one to change the boresight alignment as required. This can be done by applying the signal generated when the magnet and coil are opposite one another to a tapped delay line. If the despun section is permitted to rotate at a uniform velocity after the signal is applied to the taped delay line, then, by detecting an output of each one of the taps, one can correlate the amount of rotation of the despun section with the taps of the delay. The despun section can be stopped when a signal is sensed at an output tap indicative of a desired alignment of the boresight. Thus, one is enabled to remotely control the boresight position. Apparatus for accomplishing this is subsequently described herein.

FIG. 4 is a block diagram of the despin control system in accordance with this invention. The bolometer or earth sensor 20 applies its leading edge and trailing edge signals to sensor processing circuits 32 and also to shaft angle encoder circuits 34. The sensor processing circuit 32 is shown in more detail in FIG. 5. It serves the function of providing a line-of-sight angular error signal called a deviation error signal which is indicative of the angular displacement of the despun section from a desired orientation such as the one shown in FIG. 2. The deviation error signal is applied to suitable shaping circuits 36. The output of the shaping circuits is an error signal which is eventually applied to the motor 22 to turn the despun section to minimize the error. The shaping circuit output is applied to a summing circuit 38. The summing circuit output is applied to motor control circuits 40 which comprise the usual relay arrangement for applying power for a desired length of time to the motor 22 to cause it to rotate in a desired direction.

The motor 22 mechanically couples together the despun section 12 and the rotor 10 and by being speeded up or slowed down maintains the despun section in a desired angular position. The coil 28 and magnet 26 are represented by a rectangle labeled magnetic reference pulse generator MRP. Its output is called the master index pulse and occurs once per revolution of the spinning rotor relative to the despun section. This output is applied to the sensor processing circuit and also is used to enable a counter and logic circuit 42.

The shaft angle encoder 34 generates for each cycle of rotation of the rotor 10 relative to an external body a predetermined number of pulses. For example, 8,192 pulses per revolution. If the despun section is properly aligned, the master index pulse will occur when the counter in the counter and logic circuit 42 attains its 1,024th count (a division by 8 of the shaft encoder output takes place in the counter and logic circuit 42, as will be explained in connection with FIG. 7). If the counter in the logic circuit 42 attains this count before the arrival of the master index pulse or after the master index pulse arrives, an angular rate error signal is produced, indicative of this. This angular rate error signal is applied to the summing circuit 38 which then can apply it to the motor control circuits to cause the motor 22 to operate properly. The signal from the counter and logic circuit 42 is a line-of-sight angular rate error signal.

To summarize the operation of the functional block diagram shown in FIG. 4, leading edge and trailing edge earth sensor signals are combined with a master index pulse by the sensor processing electronic circuit to produce the deviation error signal indicative of the line-of-sight angular error, i.e., which indicates how far off from the desired line-of-sight orientation of the despun section is during the interval between the leading edge and trailing edge signals. This deviation error signal is applied through motor control circuits to the motor to drive the platform in a direction to minimize this error. A line-of-sight angular rate error control loop is also provided. Circuitry is provided for generating a predetermined number of pulses for each rotation of the rotor section of the spacecraft. A counter having the same count capacity as the predetermined number of pulses is permitted to respond thereto. The master index pulse which is generated when the rotor and despun sections align at a predetermined relative angular position is compared with the count in the counter. If the signal arrives at the predetermined count, then it is known that the despun section has an acceptable line-of-sight angular rate. If the master index pulse arrives after the counter has completed its count, then it is known that the despun section has moved from its desired oriented angular position and thus has an undesired line-of-sight angular rate.

Referring now to FIG. 5, there may be seen a block schematic diagram of the sensor processing circuit. A one-shot circuit 41 is driven each time a master index pulse is received from the master reference pulse source MRP. The one-shot circuit 41 provides an output pulse which exists for a predetermined time and then it is reset. The leading edge pulse output of the earth sensor 20 drives a flip-flop 43 to its set voltage state S, whereupon an integrator 44 is enabled to integrate the output received from the one-shot circuit 41. The trailing edge signal from the earth sensor circuit 20 drives the flip-flop to its reset voltage state R, at which time the integrator 44 is prevented from integrating any further.

The output of the integrator 44 is applied to a summing circuit 46 which compares the final level of the integrator with the level provided by a bias circuit 48. The output of the summing circuit is applied to a gate 50 which is enabled when the flip-flop is driven to its off or reset voltage state R. The output of the gate 50 is the line-of-sight angular error signal, called the deviation error signal.

The operation of FIG. 5 under 3 different conditions is discussed in reference to FIGS. 5a, 5b and 5c. In the 3 situations which are shown, the first is when the master index pulse occurs midway between the leading edge pulse and trailing edge pulse. The second situation is when the master index pulse occurs closer to the trailing edge pulse than to the leading edge pulse. The final situation is when the master index pulse occurs closer to the leading edge pulse than the trailing edge pulse. In the absence of a master index pulse from the source 26, 28, the output of the one-shot circuit 41 is high. Upon the occurrence of a leading edge pulse LEP, flip-flop 43 enables integrator 44 to commence integrating the output of the one-shot circuit 41. As shown in FIG. 5a, the wave form is positive going until a master index pulse MIP occurs. This causes one-shot circuit 41 to produce a negative going, or lower, output, whereupon integrator 44 begins to integrate in a negative going, or reverse, direction. Upon the occurrence of the trailing edge pulse TEP, the integrator is turned off. A bias level which is set by the biasing circuit 48 is compared by the summing circuit with the last level of the integrator 44. If the master index pulse occurs exactly in the center of the interval between the leading edge and trailing edge pulses, then the output from the summing circuit, which is applied to the gate 50 when it is enabled upon the occurrence of the trailing edge pulse, is zero and there is a zero error. If, as shown in FIG. 5b, the master index pulse occurs closer to the trailing edge pulse time than to the leading edge pulse time, then the integrator will not have had an opportunity to run its negative going ramp down to the bias level. The output of the summing circuit will be a positive error signal when gate 50 is enabled by the flip-flop 43.

As shown in FIG. 5c, when the master index pulse MIP occurs closer to the leading edge pulse time than the trailing edge pulse time, then the integrator ramp runs down below the bias level and a negative error signal is applied to the gate 50. These signals are shaped properly and then applied to the motor control circuit.

Reference is now made to FIG. 6 which is a schematic diagram of the shaft angle encoder 34. This is a term applied to the circuit which generates a predetermined number of pulses for each cycle of rotation of the spinning rotor relative to the earth or other external body, regardless of the time required for such cycle. An electronic shaft encoder is described here; however, mechanical or optical or other types are applicable.

The earth sensor circuit 20 and processing circuit 32 apply each leading edge pulse to the flip-flop 51. Flip-flop 51 is a toggle or bistable flip-flop and is driven between its set S and reset R states in response to successive leading edge pulses. When driven to its set state the flip-flop 51 applies its set output S to a one-shot circuit 52 whose output resets a counter 54 and also a flip-flop 56. As will be appreciated from the following discussions, the counter 54 is a cyclic counter which starts counting over again when a count cycle is completed or when it has been reset. The set S output of the flip-flop 56 energizes the coil of a relay 64. The reset output R of the flip-flop 51 energizes the coil of a relay 58, whereby its associated normally closed contact 60 is opened and its normally open contact 62 is closed. However, at this time, with flip-flop 51 set, the coil of relay 58 is not energized.

Flip-flop 56 is driven to its set state when the counter 54 fills or completes its $2^{13}$ count. The set output of flip-flop 56 energizes the coil of the relay 64, whereby it closes normally open contact 66 and opens normally closed contact 68. The normally closed contact 60 and normally open contact 66 are connected between a negative potential source 70 and a summing circuit 72. The normally open contact 62 and normally closed contact 68 are connected in series between a positive potential source 74 and the summing circuit 72. The output of the summing circuit 72 is applied to an integrator 76. The output of the integrator 76 is applied to another summing circuit 78.

A bias circuit 80 applies a sufficient bias to the summing circuit 78 so that in the absence of an input from the integrator circuit 76 a voltage controlled oscillator 82 produces a center frequency about which it is desired to control the output of the oscillator. In one embodiment of the invention this center frequency was on the order of 7,500 cycles per second and the control, or variation, of the voltage controlled oscillator was on the order of 91 cycles per second per volt with a desired output of 8,192 cycles per revolution relative to the earth.

In operation, and referring also to FIG. 6a in the following explanations, upon the occurrence of the first leading edge pulse from the earth sensor 20, assuming the flip-flop 51 to be driven thereby to its set state, the counter 54 is reset and flip-flop 56 is reset. Both relays 58 and 64 are de-energized. The relay contacts 60, 62, 66 and 68 are in the positions shown in which contacts 60 and 62 of relay 58 are closed and open, respectively, and contacts 66 and 68 of relay 64 are open and closed, respectively, which disconnects both voltage sources 70 and 74 from the integrator circuit 76. Upon being reset, or upon completing a count cycle, the counter begins a new count cycle in response to the output of the voltage controlled oscillator 82.

If the $2^{13}$ counter 54 completes its count simultaneously with the arrival of the next, or second, pulse from the earth sensor, then when flip-flop 56 is set, flip-flop 51 is reset. The respective coils of relays 58 and 64 are substantially simultaneously energized whereby the relay contacts assume positions opposite to the ones which they have in the unenergized position whereby there is still no circuit path available between the potential sources 70 and 74 and the integrator circuit 76.

Should the next, or third, earth sensor pulse occur before the counter 54 has completed its count, then the flip-flop 51 is set whereby the coil of relay 58 is de-energized before the counter 54 completes its count. The one-shot circuit now resets the counter 54 and the flip-flop 56, which de-energizes the relay 64. Since both relays are de-energized there is no circuit path. If, on the next, or fourth, leading edge pulse the counter is still running slow, when flip-flop 51 is reset and the relay 58 is energized, the contact 62 closes. This provides a circuit path between the positive voltage potential source, the closed contact 62, the closed contact 68 (counter 54 is still counting) and through the summing circuit to the integrator 76 circuit. The integrator will integrate the positive voltage for a time required for the counter to complete its count, at which time flip-flop 56 is set and relay 64 is energized to open the contacts 68. Thus, integration of the positive voltage takes place during the interval between the fourth leading edge pulse and the completion of the count cycle. The voltage controlled oscillator, as a result, will have its frequency altered to become higher so that the counter will complete its count within a shorter time, in order to complete its count coincidentally with the arrival of the next earth sensor pulse.

Should the counter 54 have been running fast instead of slow, so as to have completed its count before the fourth earth sensor pulse had arrived, the flip-flop 56 would have energized relay coil 64, closing contact 66 and completing the circuit through contact 60, now closed (since the fourth leading edge pulse has not yet arrived), between the negative potential source 70 and the integrator 76. With the arrival of the fourth leading edge pulse the relay 58 is energized and the negative voltage circuit is opened. This causes the voltage controlled oscillator to slow down or lower its frequency, whereupon the counter 54, which is now in its new count cycle, slows down so that it tends to reach its full count state, together with the arrival of a pulse from the earth sensor. In this case, the negative voltage is integrated in the interval between the completion of the count cycle and the occurrence of the fourth leading edge pulse.

From the foregoing, it will be seen that the shaft encoder circuit operates to control the frequency of the voltage controlled oscillator in a manner so that this frequency is maintained constant for each revolution of the spinning rotor. A "control" or correction occurs every two cycles of the spinning rotor. On one cycle, when the flip-flop 51 is set, the relays are de-energized and the counter is reset so that the control and count cycle starts over from a reference point. On the alternate cycle, when the flip-flop 51 is reset, correction of the counting rate, if required, takes place.

Reference is now made to FIG. 7 which is a circuit for the counter and logic circuit 42, shown in block form in FIG. 4. The output of the voltage controlled oscillator 82 in FIG. 6 is applied to a frequency divider 84. This conventionally divides the output frequency of the oscillator 82 to one which equals the count capacity of the counter 86. By way of illustration, this is 1,024, so that the output of the frequency divider 84 is 1,024 cycles per rotor revolution with respect to the earth sensor leading edge pulse.

The counter 86 is a cyclic counter and as soon as it finishes a full count, it is ready to start up again in response to further pulses from the divider 84. The counter provides a first output at a count of 1,020, a second output at a count of 1,023 and a third output at a count of 1,024. The master index pulse MIP from the magnetic reference pulse generator MRP (shown in FIG. 4) is applied to both AND gates 88 and 90. A second input to the AND gate 88 is the output of a one-shot circuit 87 coupled to and controlled by the 1,024 output of the counter 86. A second input to the AND gate 90 is the 1,023 count output of the counter. The third input of the AND gate 90 is a bias source 92. AND gates 88 and 90, respectively, drive flip-flops 94 and 96. These flip-flops are reset in response to the 1,020 count output of the counter 86.

The output of flip-flop 96 is applied as a first input to an AND gate 98. A second input to the AND gate 98 comes from a positive bias source 100. The set output of flip-flop 94 is applied to an AND gate 102, whose second input is from a negative bias source 104.

In operation, the counter 86 is driven in response to the output from divider 84. The flip-flops 94 and 96 are reset when the counter provides a 1,020 output count. If the master index pulse arrives at the same time as the 1,024 output from the counter, none of the gates are enabled. The one-shot circuit 87 delays the application of the signal to AND gate 87 until the signal MIP has gone which indicates that the spinning rotor makes one complete cycle of revolution with the despun platform properly aligned, and no error signal should be generated by the circuit shown in FIG. 7. Since there is no output from AND gate 90 and flip-flop 96 is in its reset state, AND gate 98 is not enabled and therefore no output will be derived therefrom. Should the master index pulse arrive at the time of the 1,023 count, then AND gate 90 is enabled which causes flip-flop 96 to be driven to its set state. This will enable AND gate 98 to apply positive bias from the source 100 to the motor control 40, shown in FIG. 4.

Should the master index pulse occur after the counter fills, AND gate 88 is enabled to drive flip-flop 94 to its set state. This occurs by reason of the fact that the 1,024 count output of the counter 86 drives the one-shot circuit 87 producing a delayed output (occurring at a time corresponding to a count 1,025) which is applied to the AND gate 88. If the master index pulse occurs at this time, then AND gate 88 produces an electrical output to set flip-flop 94 which in turn enables the AND gate 102, applying a negative bias to the motor control.

There has been described what may be termed a position control loop and a rate control loop for establishing the line-of-sight of the despun section. While specific circuits have been illustrated, it will be appreciated that these circuits as to specific components and organization may be modified within the spirit and scope of the invention. As an example, other coders than the electronic encoder disclosed may be used; solid state switches may replace relays; delay devices other than one-shot circuits may be employed where longer delays are desired; the count range in which corrected control of the motor is exercised may be extended by enlarging the logic circuits to include additional count outputs, according to conventional practices, etc. The rate control loop may be opened or held inoperative, if desired, by any arrangement which senses when the error output signal from the sensor processing circuit 32 is reduced to a level at which the rate control loop signal for motor control is no longer necessary for maintaining the despun section line-of-sight.

There has accordingly been described and shown herein a novel, useful and simple system for generating signals indicative of the departure of a despun section coupled to a spinning rotor, from a desired line-of-sight angular position, and for correcting the position of the despun section in response to said error signal.

What is claimed is:

1. In a system including a device having a rotor section which is rotatably coupled to a despun section, apparatus for detecting the deviation of said despun section from a desired angular position comprising:
    means supported by said rotor section and said despun section for generating a master index pulse during rotation of said rotor section for each revolution of said rotor section relative to a fixed location on said despun section;
    means supported by said rotor section for generating a leading edge pulse during rotation of said rotor section when said rotor section is oriented with respect to one boundary of a region within which is said desired angular position, and a trailing edge pulse when said rotor section is oriented with respect to a different boundary of said region; and
    means responsive to the time of occurrence of said master index pulse relative to said leading edge and trailing edge pulses for generating a deviation error signal representative of the deviation of said despun section from said desired angular position.

2. Apparatus as recited in claim 1 including means responsive to said deviation error signal for moving said despun section toward said desired angular position.

3. Apparatus as recited in claim 1, wherein said means for generating said deviation error signal representative of the deviation of said despun section from said desired angular position includes:
    means for generating a ramp signal changing in one sense in response to said leading edge pulse;
    means for causing said ramp signal to change in an opposite sense in response to the occurrence of said master index pulse;
    a bias circuit for producing a bias signal; and
    means responsive to the occurrence of said trailing edge pulse for comparing said ramp signal with said bias signal at the time of occurrence of said trailing edge pulse to produce said deviation error signal.

4. Apparatus as recited in claim 1 wherein said means supported by said rotor section and said despun section for generating a master index pulse comprises a magnet and a coil respectively supported by said rotor section and said despun section, and said means for generating leading edge and trailing edge pulses comprises a bolometer.

5. Apparatus as recited in claim 1 wherein said means for generating said deviation error signal representative of the deviation of said despun section from said desired angular position includes:
    an integrator circuit to integrate responsive to the leading edge pulse and to cease integrating responsive to the trailing edge pulse;
    a one-shot circuit having its output connected to the input of said integrator to cause operation of said integrator;
    means for applying said master index pulse to said one-shot circuit to cause said one-shot circuit to change its input to said integrator circuit;
    a bias circuit; and
    means for comparing the output of said integrator with the output of said bias circuit upon the occurrence of a trailing edge pulse to produce said deviation error signal.

6. Apparatus as recited in claim 1, including additionally means for determining the rate of deviation of said despun section from a desired angular position comprising:
    means responsive to said leading edge pulse for generating a predetermined number of pulse signals during a cycle of rotation of said spinning rotor;
    counter means for counting said predetermined number of pulse signals; and
    means for comparing the time of occurrence of said master index pulse with a predetermined count output of said counter means for producing an angular rate error signal indicative of the time of occurrence of said master index pulse with respect to the time of occurrence of said predetermined count.

7. Apparatus as recited in claim 6 including means responsive to said deviation error signal and said angular rate error signal for angularly moving said despun section toward said desired position.

8. Apparatus as recited in claim 6 wherein said means for generating a predetermined number of pulses responsive to said leading edge pulse comprises:
   a voltage controlled oscillator;
   a counter having a predetermined count capacity;
   means for applying the output of said voltage controlled oscillator to said counter; and
   means responsive to the difference in time of arrival between a predetermined count of said counter and a leading edge pulse for controlling the frequency of said voltage controlled oscillator to minimize the difference in time of occurrence between said predetermined count of said counter and said leading edge pulse.

9. In a stabilized device wherein a rotor section is coupled through bearings to a despun section, apparatus for detecting the angular rate of deviation of said despun section from a reference angular position assumed by said rotor section during rotation, comprising:
   means supported by said rotor section for generating a master index pulse for each cycle of rotation of said rotor section relative to a fixed location on said despun section;
   means for generating a leading edge pulse during rotation of said rotor section each time said rotor section assumes a predetermined angular position relative to an external reference location;
   means responsive to said leading edge pulse for generating a predetermined number of pulse signals during a cycle of rotation of said rotor section;
   counter means for counting said predetermined number of pulse signals; and
   means for comparing the time of occurrence of said master index pulse with a predetermined count of said counter means for generating an error signal indicative of the time of occurrence of said master index pulse with respect to the time of occurrence of said predetermined count, said error signal representing the angular rate of deviation of said despun section from a reference angular position assumed by said rotor section during rotation.

10. In a system as recited in claim 9 wherein said means responsive to said leading edge pulse for generating a predetermined number of pulse signals during a cycle of rotation of said rotor section comprises:
   a voltage controlled oscillator;
   a counter having a predetermined count capacity;
   means for applying the output of said voltage controlled oscillator to said counter; and
   means responsive to the difference in time of occurrence between a predetermined count of said counter and a leading edge pulse for controlling the frequency of said voltage controlled oscillator to minimize the difference of time of occurrence between said predetermined count and said leading edge pulse.

11. In a stabilized device wherein a rotor section is rotatably coupled to a despun section, apparatus for detecting the deviation of said despun section from a desired angular position comprising:
   means supported by said rotor section and said despun section for generating a master index pulse for each cycle of rotation of said rotor section relative to a fixed location on said despun section;
   means on said rotor section for generating a leading edge pulse during rotation of said rotor section when said rotor section is oriented with one boundary of a region within which is said desired angular position, and a trailing edge pulse when said rotor section is aligned with the other boundary of said region;
   means responsive to the time of occurrence of said master index pulse relative to said leading edge and trailing edge pulses for generating a deviation error signal indicating deviation of said despun section from said desired angular position;
   means for generating a number of pulses in the interval between successive leading edge pulses;
   counter means for counting said number of pulses;
   means for comparing the time of occurrence of said master index pulse, and a predetermined count of said counter means for generating an angular rate error signal representative of the time of occurrence of said master index pulse with respect to the time of occurrence of said predetermined count; and
   means responsive to said deviation error signal and said angular rate error signal for moving said despun section to be aligned with said desired angular position.

* * * * *